US008117937B2

(12) United States Patent
Konomoto et al.

(10) Patent No.: US 8,117,937 B2
(45) Date of Patent: Feb. 21, 2012

(54) AUTOMOBILE DOOR-LOCK DRIVE DEVICE

(75) Inventors: Norio Konomoto, Nagoya (JP); Akira Muramatsu, Chiryu (JP); Kazutaka Kojima, Ichinomiya (JP); Kazuhisa Hidaka, Toyota (JP); Yukinobu Kunimatsu, Toyoake (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 713 days.

(21) Appl. No.: 12/086,692

(22) PCT Filed: Dec. 27, 2005

(86) PCT No.: PCT/JP2005/023959
§ 371 (c)(1),
(2), (4) Date: Jun. 18, 2008

(87) PCT Pub. No.: WO2007/074527
PCT Pub. Date: Jul. 5, 2007

(65) Prior Publication Data
US 2009/0031838 A1 Feb. 5, 2009

(51) Int. Cl.
*F16H 1/16* (2006.01)

(52) U.S. Cl. ........................................................ 74/425

(58) Field of Classification Search ................. 74/89.14, 74/425, 606 R; 70/277, 278.7, 279.1, 280–282
See application file for complete search history.

(56) References Cited

U.S. PATENT DOCUMENTS

| | | | | |
|---|---|---|---|---|
| 5,216,929 A | | 6/1993 | Ochiai et al. | |
| 5,564,308 A | * | 10/1996 | Hoshikawa et al. | 74/89.14 |

FOREIGN PATENT DOCUMENTS

| | | | |
|---|---|---|---|
| JP | 4-134946 U | | 12/1992 |
| JP | 5-33541 A | | 2/1993 |
| JP | 8-13881 A | | 1/1996 |
| JP | 9-201003 A | | 7/1997 |
| JP | 11-196552 A | | 7/1999 |
| JP | 11210295 A | * | 8/1999 |

(Continued)

OTHER PUBLICATIONS

International Search Report in English (PCT/ISA/210).

(Continued)

*Primary Examiner* — Thomas R Hannon
*Assistant Examiner* — Phillip A Johnson
(74) *Attorney, Agent, or Firm* — Buchanan Ingersoll & Rooney PC

(57) ABSTRACT

An electric motor 1 and a worm gear 11 were housed in a case, an output shaft 2 of the electric motor 1 and a fitting hole 11C of the worm gear 11 were fitted so as to be capable of freely transmitting torque and of freely moving relatively in a direction of an axis X, and a tip of the output shaft 2 and an inner end of the fitting hole 11C set a gap D of separation in the direction of the axis X. Furthermore, a support section 30 making contact with an end section of a shaft section 11A of the worm gear 11 at the side of the electric motor 1 thereof was provided inside the case, and a thrust force resulting from dynamic inertia of the wheel gear 11 upon stopping of the electric motor 1 and acting on the worm gear 11 was borne by the support section 30.

10 Claims, 6 Drawing Sheets

FOREIGN PATENT DOCUMENTS

| | | | |
|---|---|---|---|
| JP | 2002-129789 | A | 5/2002 |
| JP | 2002-171720 | A | 6/2002 |

OTHER PUBLICATIONS

Written Opinion (PCT/ISA/237).

English language translation of International Preliminary Report on Patentability, including Written Opinion, of the International Searching Authority issued in International Application No. PCT/JP2005/023959.

* cited by examiner

AUTOMOBILE DOOR-LOCK DRIVE DEVICE

TECHNICAL FIELD

The present invention relates to an automobile door-lock drive device housing within a case a worm gear provided on an output shaft of an electric motor and a wheel gear engaging with this worm gear and performing a switching operation of a lock mechanism using a torque of this wheel gear.

BACKGROUND ART

Conventionally, automobile door-lock drive devices have been as specified in patent document 1. In this patent document 1, a worm-gear type drive gear driven by a motor (electric motor) is engaged with a reduction gear in the form of a wheel gear, a torque from this reduction gear is further engaged with a sector gear, and a torque of this sector gear is transmitted to an output gear.

Patent document 1: JP H05-33541

DISCLOSURE OF INVENTION

Problem to be Solved by the Invention

In devices provided with a reducing mechanism transmitting a torque of an electric motor from a worm gear to a wheel gear such as specified in patent document 1, an output shaft of the electric motor and the worm gear are often fixed by connection.

To give one such example, as shown in FIG. 6, a fixing-by-fitting configuration wherein an output shaft 02 of an electric motor 01 is inserted to a position whereat contact is made with an inner end of a fitting hole 011C of a worm gear 011 has been used.

To explain in more detail, freely transmitting torque is made possible by, for example, D-cutting the output shaft 02 or forming a spline fitting section on the output shaft 02 and forming the fitting hole 011C of the worm gear 011 so as to have a shape corresponding thereto. For example, this output shaft 02 is fixed by driving into the worm gear 011, or the output shaft 02 and the worm gear 011 are each completely fixed using a pin, etc. passing through both thereof. Many configurations reliably transmitting a torque of the output shaft 02 to the worm gear 011 in this way have been used.

Furthermore, in configurations wherein the output shaft 02 and the worm gear 011 are fixed by connection in this way, the relative positioning of the worm gear 011 and the wheel gear 012 must be properly maintained. For this reason, configurations wherein, as shown in the same figure, an end section 04 of the electric motor 01 at a side opposite to that of the worm gear 011 and an end section of a shaft section 011A of the worm gear 011 at a side opposite to that of the electric motor 01 are supported so as to come into contact with a case 020 are also used.

In this type of automobile door-lock drive device, locking is carried out and locking is released using an operation of the electric motor. However, when this operation of the electric motor has been stopped, a dynamic inertial force of the wheel gear acts powerfully on the worm gear in a direction of thrust immediately after this stopping. For this reason, the electric motor connected to the worm gear makes powerful contact with the case, and in some cases, an impact sound has been transmitted to a door.

A cushioning member may be used in order to curb this impact sound. However, when rubber-type material is used in the support system for the motor and worm gear, the number of parts increases and cost rises. Furthermore, it becomes impossible to maintain a high degree of accuracy of the relative positions of the worm gear and the wheel gear, and practical usage is difficult.

The object of the present invention is to provide a reasonable configuration of a device capable of reducing the impact sound generated upon stopping of the electric motor while maintaining high relative positioning of the worm gear and the wheel gear.

Means for Solving Problems

The characteristic feature of the present invention is that, in an automobile door-lock drive device housing a worm gear provided on an output shaft of an electric motor and a wheel gear engaging with this worm gear in a case and performing a switching operation of a lock mechanism using a torque of this wheel gear, a support member making contact while interposed between the worm gear and the electric motor is provided, a transmission section including the output shaft of the electric motor and the worm gear pivotally supported on the output shaft is provided, and the transmission section allows relative motion of the output shaft and the worm gear.

When the electric motor stops and a force resulting from dynamic inertia of the wheel gear acts on the worm gear in a direction of thrust, this configuration makes it possible for the support member to bear the force in the direction of thrust of the worm gear. Furthermore, this force in the direction of thrust is not transmitted to the output shaft. In addition, provision of a support member makes it possible for a position of the worm gear in a direction of an axis of the output shaft to be maintained. As a result, the relative positioning of the worm gear and the wheel gear can be maintained high. Furthermore, despite the fact that no cushioning member is used, a reasonable configuration of a device capable of reducing impact sound generated when the electric motor stops is realized.

In accordance with the present invention, the transmission section may be configured such that the output shaft is fitted into a fitting hole formed in the worm gear so as to be capable of freely transmitting torque and of freely moving relatively in a direction of an axis, and a tip of the output shaft and an inner end of the fitting hole may be separated in a direction of the axis.

As a result of this configuration, for example, a gap is formed by D-cutting the output shaft, forming the fitting hole of the worm gear with a shape fitting the D-cut, and separating a tip of the output shaft and an inner end of the fitting hole in a direction of the axis. When using a relatively-simple configuration of this kind, there is no need to use a complicated configuration and costs can be reduced.

In accordance with the present invention, the support member may include a two-pronged section forming a recess wherein the output shaft is inserted.

This configuration makes it possible for deflection of the output shaft in a radial direction to be reduced since the output shaft is inserted into the recess of the two-pronged section.

In accordance with the present invention, the support member may include a fitting section wherein an end section of the electric motor on the output-shaft side thereof is fitted and a receiving section receiving an end section of the worm gear on the electric-motor side thereof so as to be capable of rotating freely, formed as one with the two-pronged section.

This configuration makes it possible for a degree of accuracy of the relative positions of the electric motor and the worm gear to be increased since an end section of the electric motor is fitted into one of the fitting sections formed in the support section and the worm gear is supported so as to be capable of rotating freely by the receiving section formed in the support section.

In accordance with the present invention, a support member configured as a separate member to the case may be mounted on an inner section of the case.

For example, when the case is manufactured using a resin or metal mold, this configuration eliminates the need for a complicated configuration to be employed in order to integrally form the support member. Even changes of the specification of the electric motor or the worm gear can be supported simply by changing the configuration of the support member.

In accordance with the present invention, the support member may be formed inside the case as one with the case.

For example, when the case is manufactured using a resin or metal mold, this configuration makes it possible for only integral forming of the support member to be required.

In accordance with the present invention, a gear support section receiving an end section of the worm gear on a side opposite to that of the electric motor so as to be capable of rotating freely may be provided in the case, and a cushioning member making contact with the end section of the worm gear supported by this gear support section from a direction parallel to the axis may be provided in the gear support section.

This configuration makes it possible not only for the accuracy of support of this worm gear to be increased by supporting the worm gear in the support section, but even in cases where the worm gear moves in a direction of approach to the gear support section due to an action of a force from the wheel gear upon stopping of the electric motor, for this motion to be reduced and stopped by the cushioning member and the occurrence of impact sound to be curbed.

In accordance with the present invention, a cushioning member making contact with the end section of the worm gear supported by the receiving section from a direction parallel to the axis may be provided in this receiving section.

Even in cases where the worm gear moves in a direction of approach to the electric motor upon stopping of the electric motor, this configuration makes it possible for this motion to be reduced and stopped by the cushioning member and the occurrence of impact sound to be curbed.

In accordance with the present invention, a cushioning member may be provided between a tip of the output shaft and an inner end of the fitting hole.

Even in cases where the output shaft and the worm gear move in a direction so as to approach relatively due to an external force acting on the worm gear, this configuration makes it possible for this motion to be reduced and stopped by the cushioning member and the occurrence of impact to be curbed.

In accordance with the present invention, a bearing section may be formed as a protrusion on the electric motor at an end thereof opposite to that of the output shaft, a motor support section wherein this bearing section is supported by fitting may be provided in the case, and a cushioning member making contact with the bearing section supported by this motor support section from a direction parallel to the axis may be provided in this motor support section.

Even in cases where the electric motor moves so as to become separated from the worm gear, this configuration makes it possible for this motion to be reduced and stopped by the cushioning member and the occurrence of impact to be curbed.

BEST MODE FOR CARRYING OUT THE INVENTION

The following is a description of the preferred embodiments of the present invention, with reference to the drawings.

Overall Configuration

As shown in FIG. 1 to FIG. 4, a reduction mechanism including a worm gear 11 pivotally supported on an output shaft 2 of an electric motor 1 and a wheel gear 12 engaging with this worm gear 11 is housed in a case 20. The wheel gear 12 is supported by the case 20 via a support shaft 13. An arm 15 having a recess 15A operated by a pin 14 formed on this wheel gear 12 as a protrusion parallel to the support shaft 13 is housed in the case 20. An operation shaft 16 rotating as one with this arm 15 is pivotally supported by the case 20, and an operation system transmitting an operation force from an arm (not shown) provided in this protrusion section to a lock mechanism (not shown) is formed. An automobile door-lock drive device operating the lock mechanism is formed from these.

This door-lock drive device is provided inside the door of a vehicle such as an automobile, and operations switching the lock mechanism between a locked condition and an unlocked condition can be achieved through reduction of a torque of the electric motor 1 and transmission thereof to the operation shaft 16.

The electric motor 1 is provided with bearing sections 3, 4 at a front-end side and a rear-end side of the motor body as a bearing means for the output shaft 2 rotating as one with an internal rotor (not shown). This output shaft 2 passes through the bearing section 3 of the front-end side. A protrusion section of this output shaft 2 is formed by D-cut machining so as to have a D-shaped cross section.

The output shaft 2 and the worm gear 11 are disposed on the same axis X. This worm gear 11 includes a shaft section 11A and a gear section 11B formed at a central position in the direction of the axis X on this shaft section 11A. A fitting hole 11C wherein the output shaft 2 is fitted so as to be capable of freely transmitting torque is formed at one end-section side.

The output shaft 2 having been D-cut in this way and the fitting hole 11C form a transmission section wherein a torque of the output shaft 2 is transmitted to the worm gear 11, and in addition, the output shaft 2 and the worm gear 11 are capable of freely moving relatively in the direction of the axis X. Furthermore, with the electric motor 1 and the worm gear 11 supported by the case 20, as shown in FIG. 3 and FIG. 4, a tip of the output shaft 2 and an inner end of the fitting hole 11C are separated in the direction of the axis X and a gap therebetween of a distance D is formed.

This transmission section may be configured by, for example, forming a spline section on an outer surface of the output shaft 2 and a structure fitting with the spline section in the fitting hole 11C, or by embedding a key in a channel formed parallel to a direction of an axis of the output shaft 2 and forming a channel into which this key enters in a hole section of the worm gear 11.

Support Structure

A motor support section 21 into which the bearing section 4 at the rear-end side of the electric motor 1 is fitted and a gear support section 22 into which the shaft section 11A of the worm gear 11 at an end thereof opposite to that of the electric motor is fitted are formed on an inner surface of the case 20. Furthermore, a support member 30 touching (making contact with) the shaft section 11A of the worm gear 11 at an end section thereof on the side of the electric motor is mounted on an inner surface of the case 20.

The support member 30 has a two-pronged member 31 including a recess 31A wherein the output shaft 2 is fitted, and a receiving section 32 supporting the shaft section 11A of the worm gear 11 so as to be capable of freely rotating and a fitting section 33 into which the bearing section 3 at the front-end side of the electric motor 1 (example of an end section at the output-shaft side of the electric motor 1) has been fitted, formed as one.

As shown in FIG. 5, a mounting section 34 is provided on this support member 30, and this mounting section 34 is fixed by fitting into a channel-shaped section 23 formed in the case 20. Although a configuration whereby this support member 30 is fixed by fitting thereof into the channel-shaped section 23 is used, a means of fixing through bonding by melting the plastic at a contact point using a laser beam or a fixing configuration using adhesive or a screw, etc. may be used.

In particular, the support member 30 may, upon formation of the case 20, be formed as one with the case 20 using the same material. By forming as one with the case 20 in this way, the strength of this supporting member 30 can be raised.

Function of Support Structure

As the electric motor 1 and the worm gear 11 are supported by the case 20 in this way, upon driving of the electric motor 1, the torque from the output shaft 2 is transmitted from the worm gear 11 to the wheel gear 12, and the pin 14 of this wheel gear 12 drives the arm 15 via the recess 15A. In this way, the lock mechanism can be locked and unlocked using the rotation of the arm 15. After operation of this electric motor 1, the dynamic inertia of the wheel gear 12 acts on the worm gear 11 in a direction of thrust when the electric motor 1 has been stopped. However, as force from the worm gear 11 is borne by the support member 30, the phenomenon of the electric motor 1 making powerful contact with the case 20 is prevented and impact sound is not generated.

In particular, by supporting an end section of the shaft section 11A of the worm gear 11 in the receiving section 32 formed in the support member 30 so as to be capable of rotating freely and supporting the bearing section 3 at the front-end side of the electric motor 1 in a fitting condition in the fitting section 33 formed in this support member 30, a high degree of accuracy of the relative positions of the worm gear 11 and the electric motor 1 can be maintained.

Other Embodiments

In addition to the above-explained embodiment, the present invention may be configured as follows.

(a) A configuration wherein an end section of the output shaft 2 has a member of a large diameter, a fitting hole is formed parallel to the direction of the axis X on this, and the worm gear 11 has a shaft-shaped member inserted into this fitting hole so as to be capable of freely transmitting torque may be provided as a transmission section transmitting torque from the output shaft 2 of the electric motor 1 to the worm gear 11.

(b) A mechanism assembling a simple gear and crank mechanism to a transmission system transmitting torque from the worm gear 11 to the operation shaft 16 may be used, or a non-circular gear may be used to convert rotation motion from the electric motor 1 into intermittent motion.

(c) As shown in FIG. 7, a cushioning member 41 of rubber, etc. may be provided to stop the motion of the worm gear 11 in a direction of approach to the gear support section 22. In the event that such a configuration is used, even if the worm gear 11 moves in a direction of the gear support section 22 upon stopping of the wheel gear 12, this motion is reduced and stopped by the cushioning member 41, and the occurrence of impact is curbed.

(d) As shown in FIG. 8, a cushioning member 42 of rubber, etc. may be provided to stop the motion of the worm gear 11 in a direction of approach to the receiving section 32 (a direction of approach to the electric motor 1). In the event that such a configuration is used, even if the worm gear 11 moves in a direction of the receiving section 32 upon stopping of the wheel gear 12, this motion is reduced and stopped by the cushioning member 42, and the occurrence of impact is curbed.

(e) As shown in FIG. 9, a cushioning member 43 of rubber, etc. may be provided in a gap between a tip of the output shaft 2 of the electric motor 1 and an inner end of the fitting hole 11C of the worm gear 11. In the event that such a configuration is used, when either of the electric motor 1 or the worm gear 11 moves in a direction of approach to the other thereof, this motion is reduced and stopped by the cushioning member 43, and the occurrence of impact is curbed.

(f) As shown in FIG. 10, a cushioning member 44 of rubber, etc. may be provided in the motor support section 21 supporting the bearing section 4 at the rear-end side of the electric motor 1 to stop the motion of the electric motor 1 towards this motor support section 21. In the event that such a configuration is used, even when force acts so as to move the electric motor 1 in the direction of the motor support section 21, this motion is reduced and stopped by the cushioning member 44, and the occurrence of impact is curbed.

DESCRIPTION OF REFERENCE NUMERALS

Figure 1:
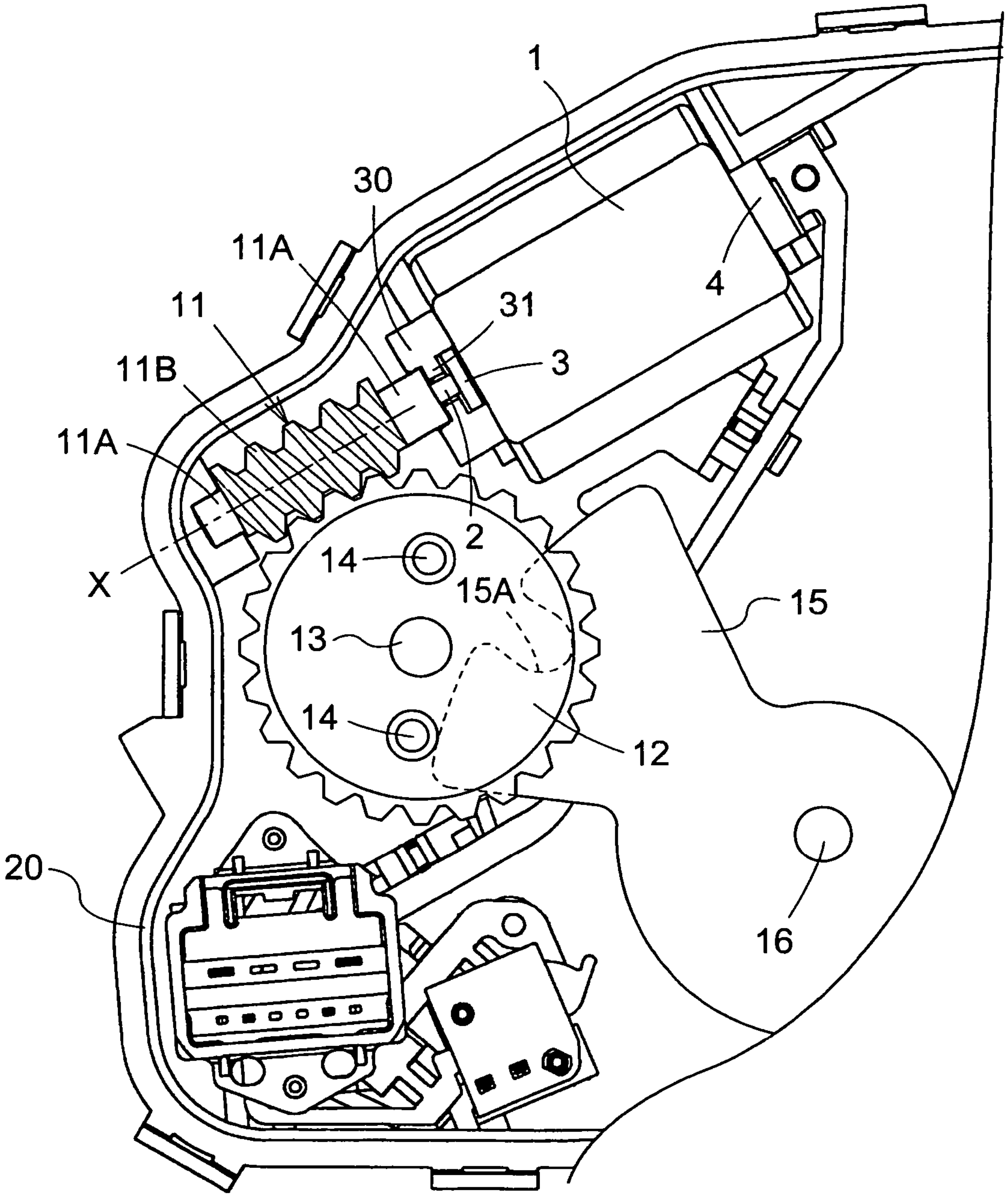
FIG. 1: Partial cut-out front elevation view of a drive device.
Figure 2:
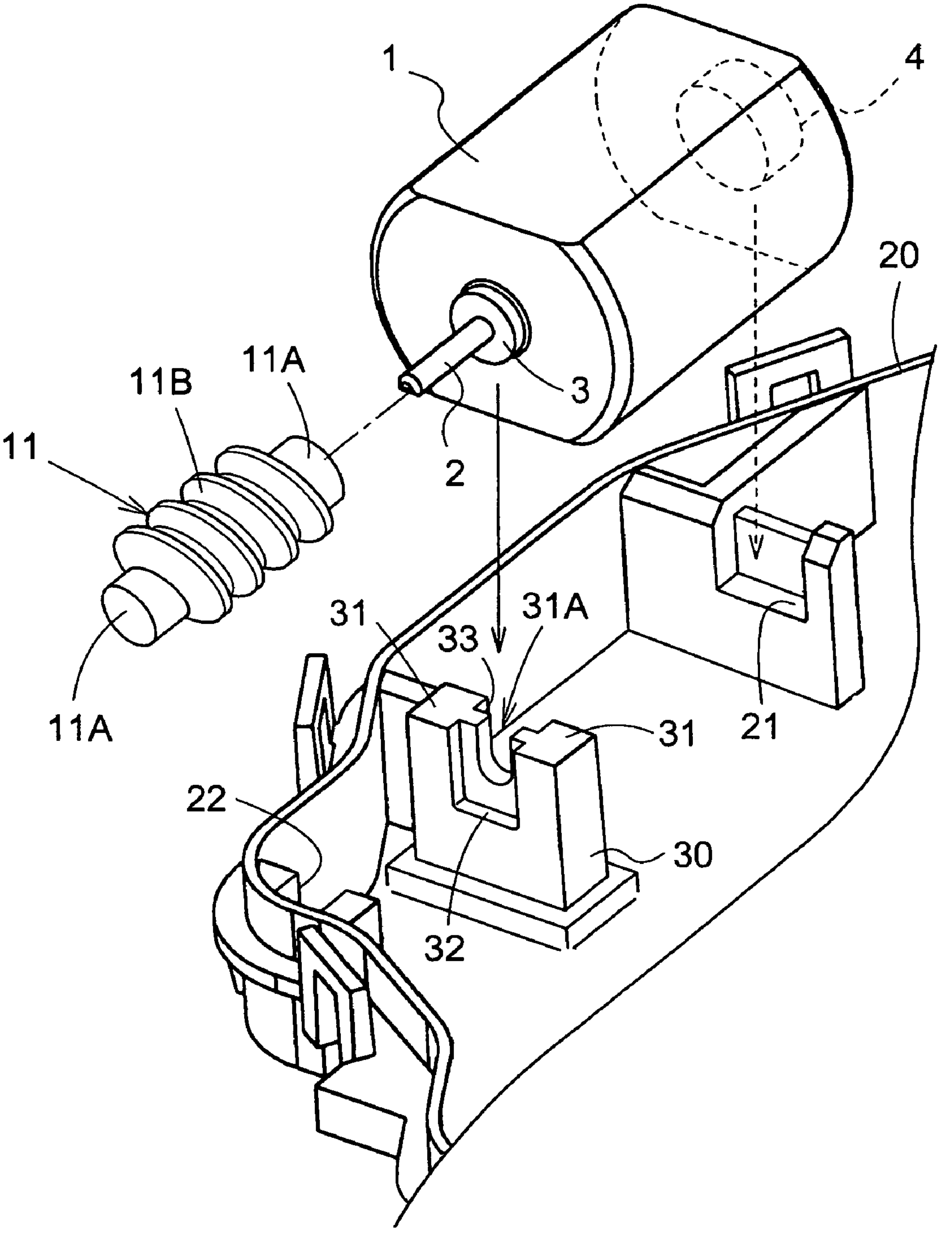
FIG. 2: Perspective view of an electric motor and a worm gear separated from a case.
Figure 3:
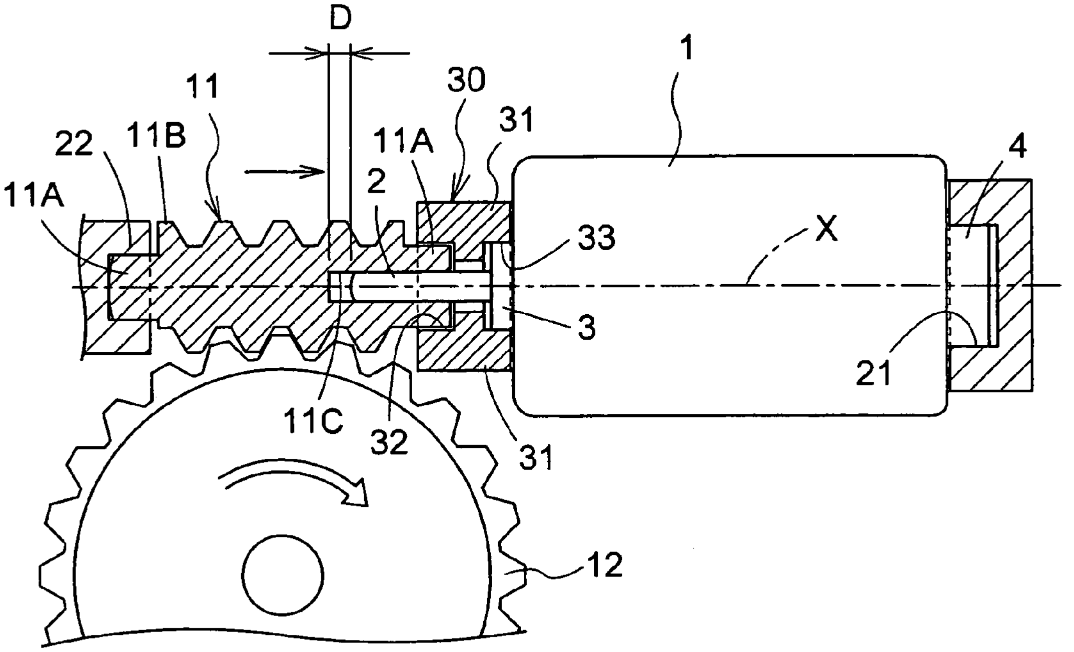
FIG. 3: Cross-sectional view showing a support condition of an electric motor and a worm gear.
Figure 4:
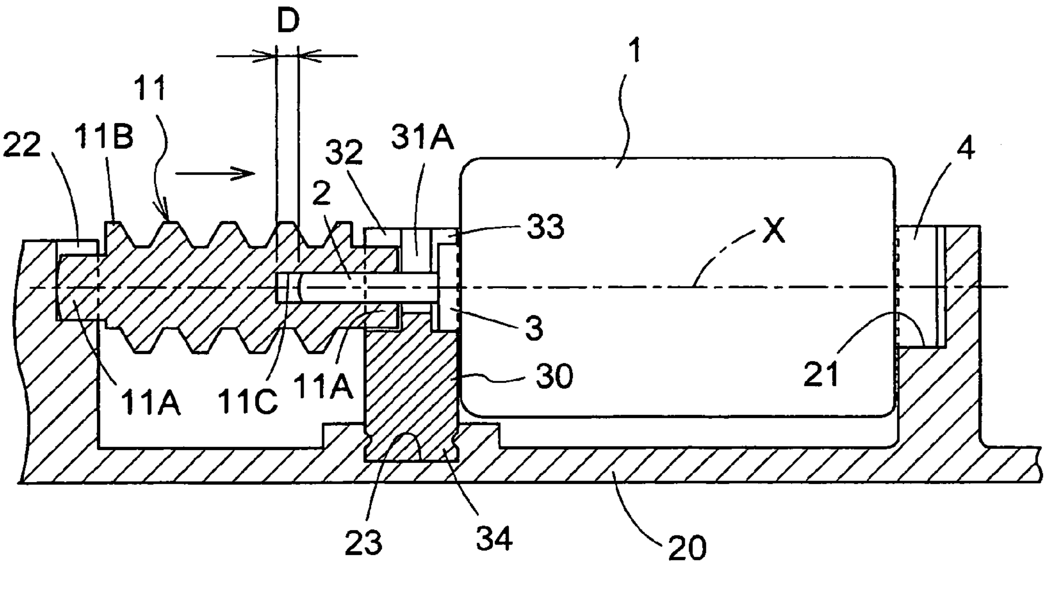
FIG. 4: Cross-sectional view showing a support condition of a support section.
Figure 5:
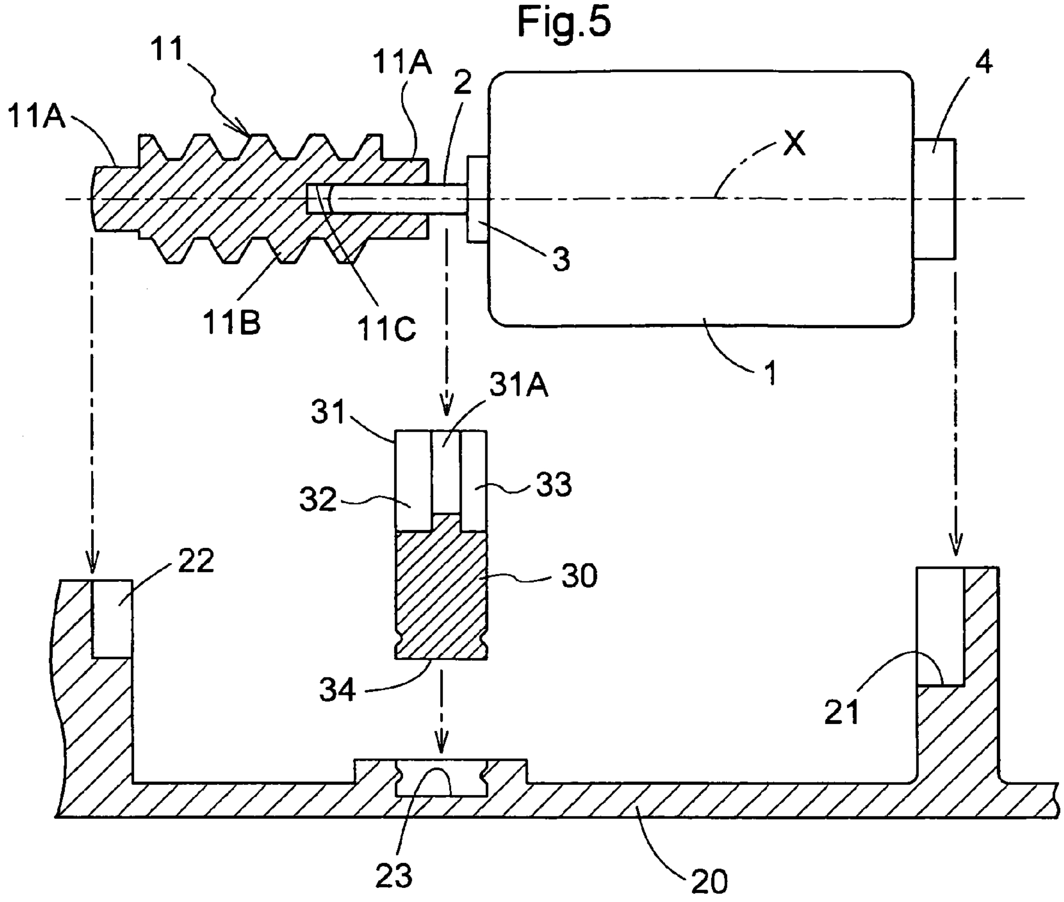
FIG. 5: Cross-sectional view of an electric motor and a worm gear separated from a case.
Figure 6:
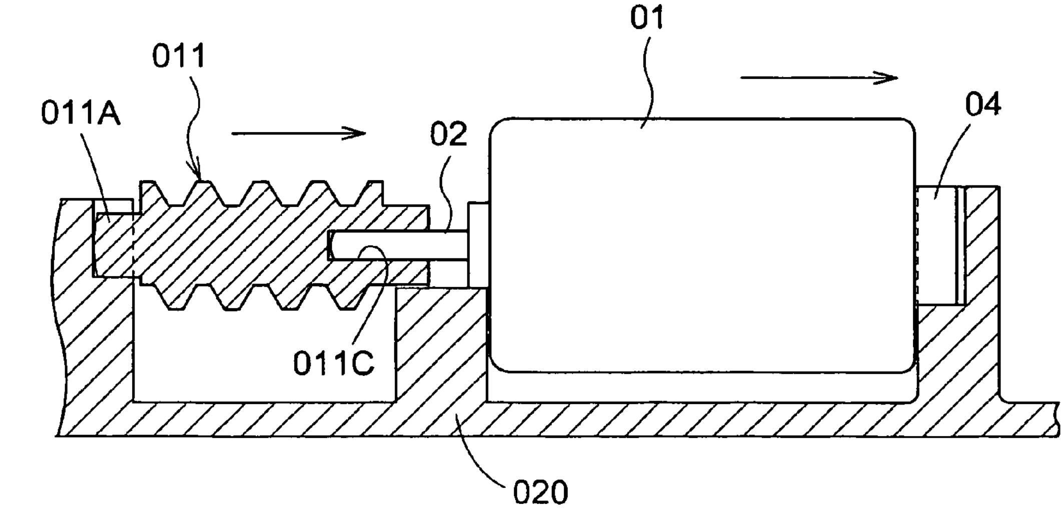
FIG. 6: Cross-sectional view showing a conventional support mechanism of an electric motor and a worm gear.
Figure 7:
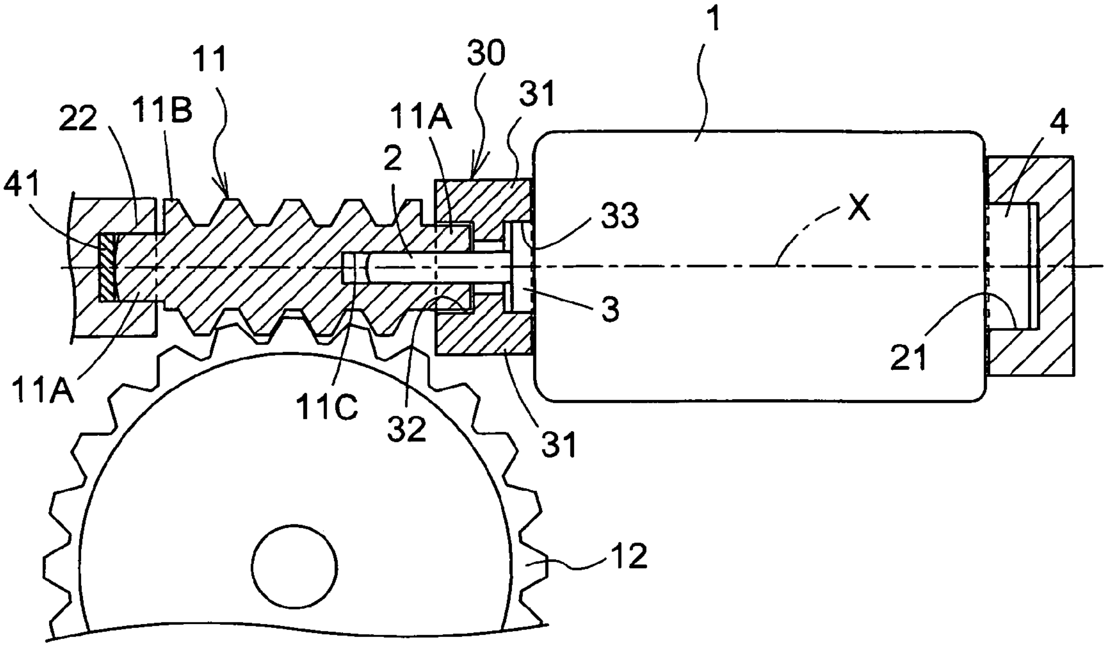
FIG. 7: Cross-sectional view showing a support condition of an electric motor and a worm gear, with a cushioning member in the gear support section.
Figure 8:
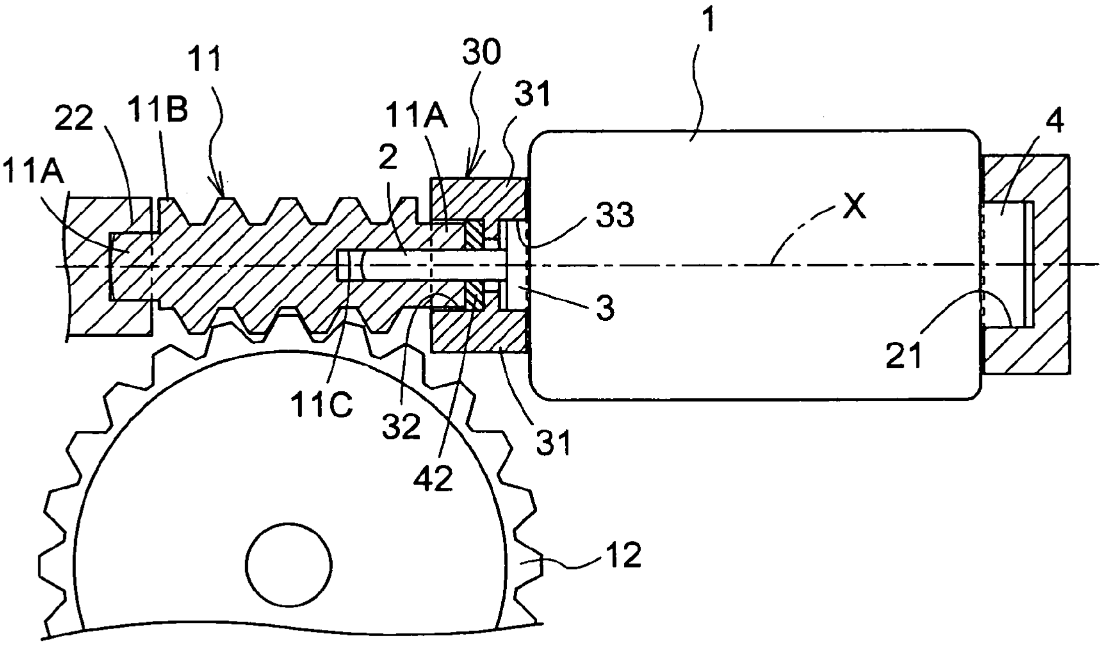
FIG. 8: Cross-sectional view showing a support condition of an electric motor and a worm gear, with a cushioning member in the receiving section.
Figure 9:
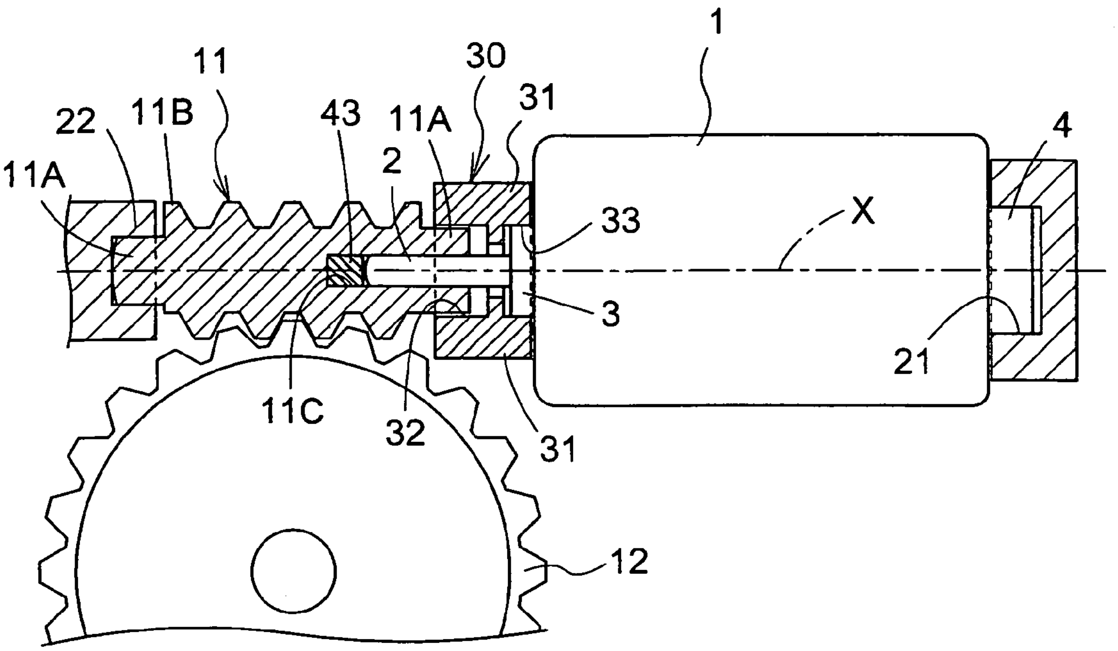
FIG. 9: Cross-sectional view showing a support condition of an electric motor and a worm gear, with a cushioning member between a tip of the output shaft and an inner end of the fitting hole.
Figure 10:
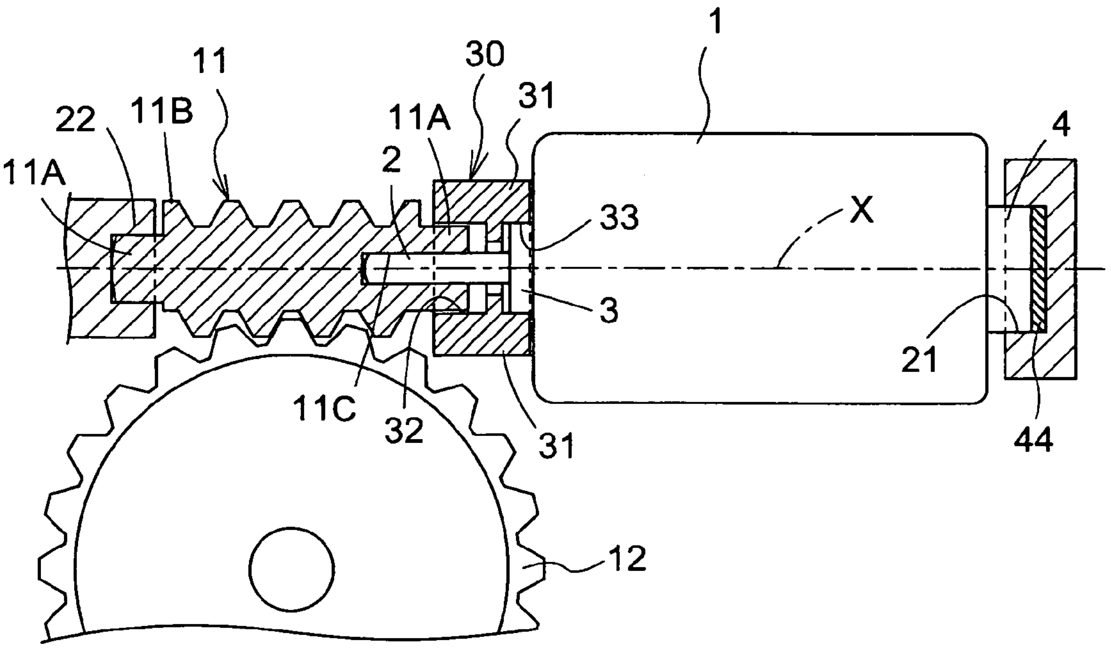
FIG. 10: Cross-sectional view showing a support condition of an electric motor and a worm gear, with a cushioning member in the motor support section.

1. Electric motor
2. Output shaft
4. Bearing section
11. Worm gear
11C. Fitting hole
12. Wheel gear
20. Case

21. Motor support section
22. Gear support section
30. Support section
31. Two-pronged member
31A. Recess
32. Receiving section
33. Fitting section
X. Axis

The invention claimed is:

1. An automobile door-lock drive device housing a worm gear provided on an output shaft of an electric motor and a wheel gear engaging with the worm gear in a case and performing a switching operation of a lock mechanism using a torque of the wheel gear, comprising:

a support member provided in the case and making contact with the worm gear and the electric motor while interposed therebetween, and a transmission section comprising the output shaft of the electric motor and the worm gear pivotally supported on the output shaft, the transmission section being configured so as to allow relative motion of the output shaft and the worm gear along a thrust direction of the worm gear, the support member being configured to contact the worm gear to receive a force along the thrust direction due to dynamic inertia of the wheel gear, when the motor is stopped, wherein the support member includes a bottomed recess, and an end section of the worm gear on the electric-motor side is rotatably received in the bottomed recess.

2. The automobile door-lock drive device of claim 1, wherein the transmission section is configured such that the output shaft is fitted into a fitting hole formed in the worm gear so as to be capable of freely transmitting torque and of freely moving relatively in a direction of an axis, and a tip of the output shaft and an inner end of the fitting hole are separated in a direction of the axis.

3. The automobile door-lock drive device of claim 2, wherein a gear support section receiving an end section of the worm gear at a side opposite to that of the electric motor so as to be capable of rotating freely is provided in the case, and a cushioning member making contact with the end section of the worm gear supported by the gear support section from a direction parallel to the axis is provided in the gear support section.

4. The automobile door-lock drive device of claim 2, wherein a cushioning member is provided between a tip of the output shaft and an inner end of the fitting hole.

5. The automobile door-lock drive device of claim 1, wherein the support member comprises a two-pronged section forming the bottomed recess.

6. The automobile door-lock drive device of claim 5, wherein the two-pronged section forms a fitting section wherein an end section of the electric motor on the output-shaft side thereof is fitted.

7. The automobile door-lock drive device of claim 6, wherein a cushioning member making contact with the end section of the worm gear supported by the bottomed recess from a direction parallel to an axis is provided in the bottomed recess.

8. The automobile door-lock drive device of claim 1, wherein the support member is configured as a separate member to the case and is mounted on an inner section of the case.

9. The automobile door-lock drive device of claim 1, wherein the support member is configured as one with the case and formed inside the case.

10. The automobile door-lock drive device of claim 1, wherein a bearing section is formed as a protrusion on the electric motor at an end thereof opposite to that of the output shaft, a motor support section wherein the bearing section is supported by fitting is provided in the case, and a cushioning member making contact with the bearing section supported by the motor support section from a direction parallel to an axis is provided in the motor support section.

* * * * *